US012710377B2

(12) United States Patent
Smirnov et al.

(10) Patent No.: US 12,710,377 B2
(45) Date of Patent: Aug. 18, 2026

(54) METHOD FOR FAULT ANALYSIS IN WAFERS

(71) Applicant: Robert Bosch GmbH, Stuttgart (DE)

(72) Inventors: Waldemar Smirnov, Reutlingen (DE); Ralf Augke, Kusterdingen (DE); Michel Janus, Kirchentellinsfurt (DE); Thomas Schnitzler, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 289 days.

(21) Appl. No.: 18/427,609

(22) Filed: Jan. 30, 2024

(65) Prior Publication Data

US 2024/0264090 A1 Aug. 8, 2024

(30) Foreign Application Priority Data

Feb. 2, 2023 (DE) ..................... 10 2023 200 851.3

(51) Int. Cl.
*G01N 21/95* (2006.01)
*G01N 21/88* (2006.01)

(52) U.S. Cl.
CPC ..... *G01N 21/9501* (2013.01); *G01N 21/8851* (2013.01); *G01N 2021/8864* (2013.01)

(58) Field of Classification Search
CPC ........... G01N 21/9501; G01N 21/8851; G01N 2021/8864; H01L 22/12; H01L 22/20; G06V 10/762; G06V 10/764
See application file for complete search history.

(56) References Cited

U.S. PATENT DOCUMENTS

| | | | |
|---|---|---|---|
| 11,741,596 B2 * | 8/2023 | Park | G06T 7/0004 |
| 2021/0150688 A1 * | 5/2021 | Bidault | G06N 3/04 |
| 2023/0289949 A1 * | 9/2023 | Shin | G06V 20/52 |
| 2025/0148763 A1 * | 5/2025 | Evans | G06V 20/584 |

* cited by examiner

*Primary Examiner* — Andrew M Moyer
*Assistant Examiner* — Ahmed A Nasher
(74) *Attorney, Agent, or Firm* — Maginot, Moore & Beck LLP

(57) ABSTRACT

A method for fault analysis in wafers includes determining multiple wafer maps comprising indications of anomalies of the wafers, performing an evaluation based on the determined wafer maps, and performing the fault analysis based on the evaluation performed. Performing the evaluation includes multiple execution of a cluster analysis based on the determined wafer maps using different parameters, and identifying distinct clusters determined by the differently parameterized cluster analyses.

9 Claims, 3 Drawing Sheets

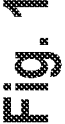
Fig. 1
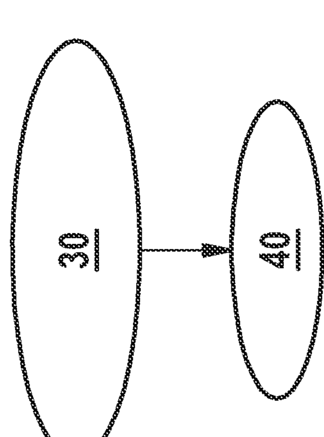
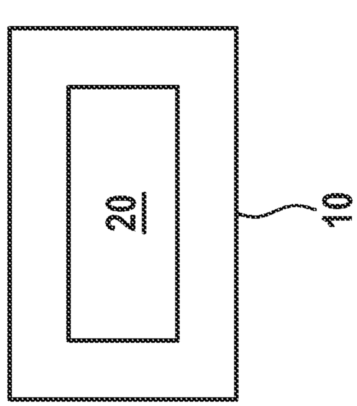
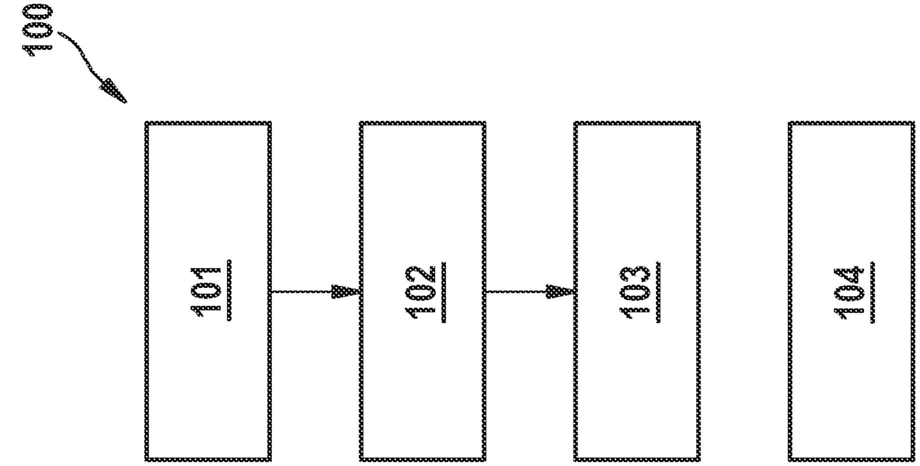

301
50
50
50
50
50
50
50

METHOD FOR FAULT ANALYSIS IN WAFERS

This application claims priority under 35 U.S.C. § 119 to application no. DE 10 2023 200 851.3, filed on Feb. 2, 2023 in Germany, the disclosure of which is incorporated herein by reference in its entirety.

The present disclosure relates to a method for fault analysis in wafers. The disclosure also relates to a computer program and a device for this purpose.

BACKGROUND

It is known from the prior art that the automated detection of defects on wafers is possible. In this context, production defects or impurities can be detected automatically, for example from optical images of a wafer.

SUMMARY

The object of the disclosure is a method having the features of the disclosure, a computer program having the features of the disclosure, and an apparatus having the features of the disclosure. Further features and details of the disclosure will emerge from the description, and the drawings. In this context, features and details described in the context of the method according to the disclosure clearly also apply in the context of the computer program according to the disclosure and the device according to the disclosure, and respectively vice versa, so mutual reference is or can always be made with respect to the disclosure of the individual aspects of the disclosure.

The object of the disclosure is in particular a method for fault analysis in wafers, preferably after and/or within wafer production. The following steps can in this case be preferably performed in an automated manner, and/or repeated, and/or sequentially:

- determining at least one and in particular multiple wafer map(s), which comprise an indication of anomalies of at least one wafer, and in particular multiple wafers, preferably in the form of a dataset consisting of multiple wafer maps, whereby the number of wafer maps in the dataset can, e.g., comprise the usual production amount from a production area within a few hours,
- performing an evaluation based on the at least one determined wafer map,
- performing the fault analysis based on the evaluation performed.

Furthermore, performing the evaluation comprises at least the following steps:

- multiple, in particular iterative, executions of a cluster analysis based on the at least one determined wafer map using different parameters, but preferably based on the same data, which can result from the at least one determined wafer map,
- identifying distinct, in particular different, clusters which are determined by the differently parameterized cluster analyses.

The clusters can in this case be interpreted as signatures. Advantageously, signatures, i.e., in particular similar anomalies on different wafers at substantially similar positions, can thereby be efficiently found by the cluster analyses. One advantage in this case is that no labels are needed to find similar signatures. The similar signatures found can be used to automatically find real-time production issues (root cause analysis). Furthermore, older signatures can additionally be included, i.e., wafers having similar issues can be found from a history. The signature detection can in this case be independent of the manufacturing technology and independent of the product on the wafers. The method is therefore particularly versatile.

It is further conceivable that the different parameterizations of the cluster analyses are performed such that clusters determined from the different executions of the cluster analysis partially differ from one another. In this way, the distinct clusters and preferably further clusters determined multiple times can be identified from the determined clusters. The multiple execution of the cluster analysis has the advantage that as many clusters (i.e., consistent anomalies on the wafers) as possible can be identified (preferably signatures). The identified clusters can then be used for the fault analysis, e.g. by an output of the identified clusters or signatures.

It can further be provided that clusters determined from the different executions of the cluster analysis partially differ from one another. It can also be possible that clusters determined multiple times, i.e. the same cluster, can result from the different executions of the cluster analysis. The clusters determined multiple times can therefore be combined. This has the advantage that the condensation of the determined clusters can improve the further analyses.

According to a further advantage, it can be provided that the same data is analyzed by the different cluster analyses, whereby the different cluster analyses differ in terms of their parameterization, whereby the data results from the at least one determined wafer map. For this purpose, a clustering algorithm can, e.g., be applied multiple times using different parameters to data resulting from the at least one or more wafer maps. Specifically, the clustering algorithm can, e.g., be run at different hyperparameters. For example, 5 different parameterizations of the clustering algorithm×5 different two-dimensional data maps can result in 25 cluster analyses.

It is also advantageous if multiple different wafers are provided as the at least one wafer, preferably from a wafer production. The clusters can each be identified as signatures specific to consistent abnormalities in multiple different wafers. Knowledge of such consistent anomalies can enable conclusions to be made about faults in the production of the wafers and therefore improve production. In particular, the method according to the disclosure can be aimed at determining such signatures and not, e.g., individual defects in individual wafers.

It is also conceivable that the at least one determined wafer map comprises multiple wafer maps for different wafers. The wafer maps can in this case be combined, preferably to form a matrix and/or by means of a dimensional extension and/or a subsequent dimensional reduction and/or using hyperparameters in order to analyze the combined wafer maps of the different wafers by means of the different cluster analyses. For example, a matrix in the third dimension can be assigned to each wafer using the dimensional extension. A dimensional reduction of this three-dimensional matrix in particular can then be performed. For example, UMAP can be used as a preferred and fast algorithm or a t-SNE dimensional reduction algorithm. In this way, for example, two-dimensional maps are output, which can also be referred to as an embedding. In the respective embedding, the wafer maps that are similar can be grouped close to each other. Each of these coordinates in the two-dimensional map of the embedding can in this case correspond to a wafer.

The dimensional reduction can further be performed multiple times, in which case the three-dimensional matrix can be reduced by a different set of hyperparameters for each execution. Hyperparameters for dimensional reduction can include: a metric (similarity measure), and/or a minimum number of neighbors found, and/or the like.

It is also conceivable that the at least one wafer map results from a metrological detection of the anomalies on a wafer during wafer production. Alternatively, or additionally, it is possible for the at least one wafer to comprise a silicon wafer and/or a metal wafer. The method according to the disclosure can advantageously be performed automatically within a wafer production process. In this case, the at least one wafer map can result from an automated metrological detection, e.g. an optical recording and/or analysis, of the wafers produced. Furthermore, a warning can also be output for the production process depending on the fault analysis.

The object of the disclosure is also a computer program, in particular a computer program product comprising instructions that, when the computer program is executed by a computer, prompt said computer program to perform the method according to the disclosure. Therefore, the computer program according to the disclosure brings with it the same advantages as have been described in detail with reference to a method according to the disclosure.

The disclosure also relates to a device for data processing, which is configured to perform the method according to the disclosure. The device can, e.g., be a computer that executes the computer program according to the disclosure. The computer can comprise at least one processor for executing the computer program. A non-volatile data memory can also be provided, in which the computer program can be stored and from which the computer program can be read by the processor for execution.

The disclosure can also relate to a computer-readable storage medium which comprises the computer program according to the disclosure. The storage medium is, e.g., designed as a data storage means, e.g. a hard drive, and/or a non-volatile memory, and/or a memory card. The storage medium can, e.g., be integrated into the computer.

The method according to the disclosure can moreover also be executed as a computer-implemented method.

BRIEF DESCRIPTION OF THE DRAWINGS

Further advantages, features, and details of the disclosure will emerge from the following description, in which exemplary embodiments of the disclosure are described in detail with reference to the drawings. In this context, the features specified in the description can each be essential to the disclosure individually or in any combination. Shown are:

FIG. 1 a schematic visualization of a method, an apparatus and a computer program according to exemplary embodiments of the disclosure;

DETAILED DESCRIPTION

Figure 2:
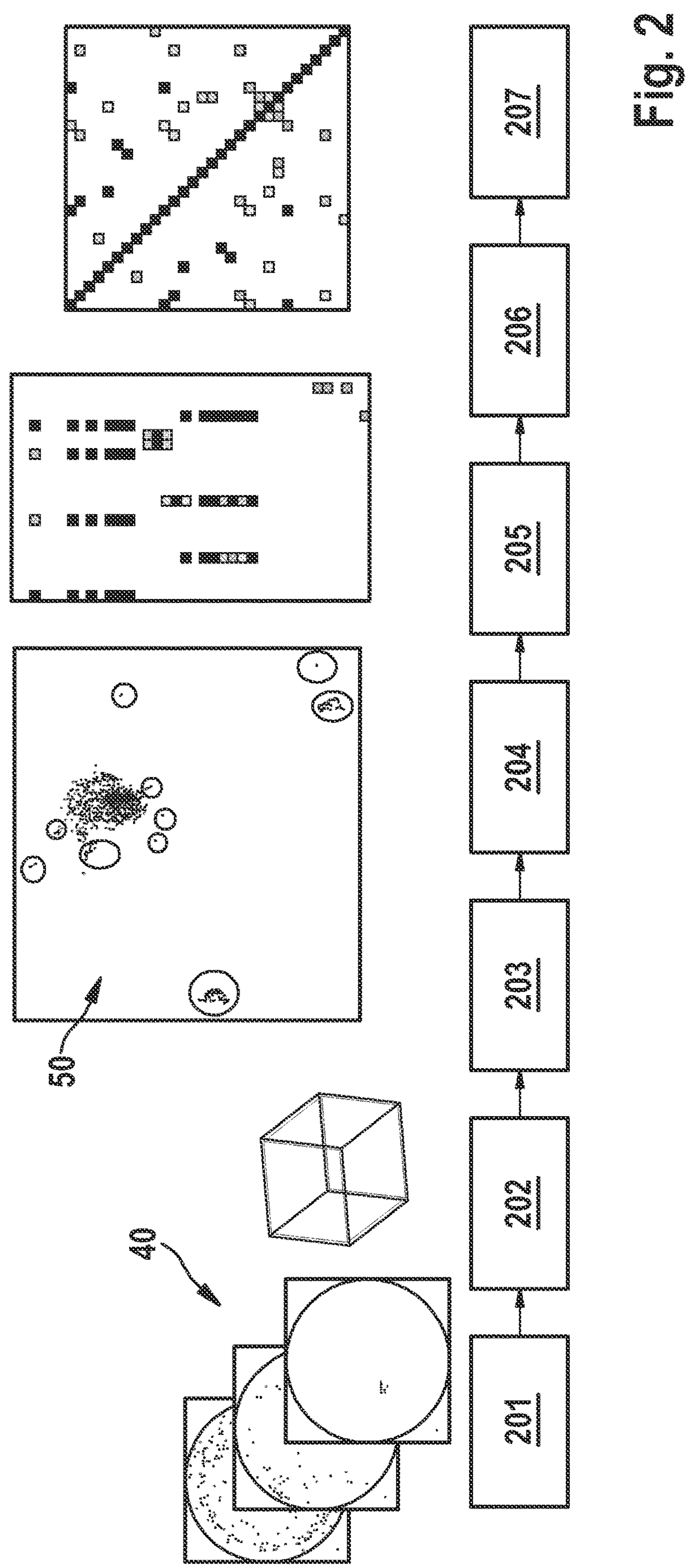
FIG. 2 further details of a method according to one embodiment of the disclosure.

In the following drawings, identical reference signs are used for identical technical features, even in different exemplary embodiments.

FIG. 1 illustrates a method 100 for fault analysis in wafers 30 according to exemplary embodiments of the disclosure. Also shown are a computer program 20 and a device 10 according to exemplary embodiments of the disclosure.

According to a first method step 101, a determination of at least one wafer map 40 can be provided. The respective wafer map 40 can comprise an indication of anomalies of at least one wafer 30. For example, defects in a data structure for the wafers 30 are labeled for this purpose. According to a second method step 102, an evaluation based on the at least one determined wafer map 40 can then be performed. According to a third method step 103, this enables the fault analysis to be performed based on the evaluation performed. Performing 102 the evaluation can in this case include executing a cluster analysis 104 multiple times, which is performed based on the at least one determined wafer map 40 using different parameters. Distinct clusters 50 can also be identified during the evaluation, which are determined by the differently parameterized cluster analyses 104. The different parameterization of the cluster analyses 104 can in this case be performed such that clusters 50 determined from the different executions of the cluster analysis 104 partially differ from one another. Furthermore, the at least one determined wafer map 40 can comprise multiple wafer maps 40 for different wafers 30, whereby the wafer maps 40 can be combined together to form a matrix 60.

FIG. 2 shows the method according to embodiments of the disclosure along with further details. It can according to an optional first step 201 be provided that wafer data are provided, preferably in the form of wafer images. The wafer data can, e.g., include optical camera images and/or electrical test results of chips of the photographed wafer 30 and/or defects already detected on the wafer 30 by other inspection machines and/or methods. For this purpose, samples of wafers 30 and/or all wafers 30 are, e.g., inspected upon completion of production of the wafers 30. Extraction of a wafer map 40 can be performed from the wafer data and, if necessary, the detected defects or test results. The wafer map 40 can be a defect map, i.e., includes indications of where an anomaly occurs on the wafer. An anomaly can be a defect such as an impurity, particles, or another abnormality. Signatures are also referred to in particular when defects of the wafers remain the same at identical or similar locations.

The wafer map 40 can be provided as a two- or multi-dimensional data structure. The wafer map 40 can, e.g., comprise a table dataset comprising coordinates. For example, (0,0) can in this case denote the center of the wafer 30, and the entries in the table describe the defect, e.g. a defect at position (30,30), by a categorization such as "critical" or "non-critical", the defect class, or the electrical measurement along with the reference measurement or size of the defect.

A matrix can then be generated from the wafer map 40. This can also be referred to as quantization. Several options are possible for this purpose. The matrix can thus be created depending on the size of the wafer 30. In the case of a 150 mm or 200 mm wafer 30, a matrix of 150×150 or 200×200 can, e.g., be initialized, whereby each square millimeter can have an entry in the matrix. The entries in the matrix can then be derived from a histogram. For example, an entry "10" would then correspond to an occurrence of 10 defects. Another option is for the entry in the matrix to be set to 1 if a defect is present in the corresponding location. The entries in the matrix can also be provided as grayscale values, e.g. depending on defect severity or by defect type. Furthermore, different standardizations can be provided, whereby the entries can also be derived from a histogram and/or each matrix entry is divided by the highest matrix entry, so that the resulting highest matrix entry corresponds exactly 1 for each wafer 30. Furthermore, a cut-off value can also be defined, for which all values of the matrix greater than the cut-off value (e.g., >1) are set to the cut-off value (e.g., =1).

According to a further step 202 shown in FIG. 2, the matrix can be extended with respect to a further dimension, preferably along a third dimension. This dimensional extension provides each wafer 30 with a matrix, in particular in the third dimension. A dimensional reduction 203 of the three-dimensional matrix in particular can then be performed. For example, UMAP can be used as a preferred and fast algorithm or a t-SNE dimensional reduction algorithm. For example, an output matrix having 200×200×5000 elements can be assumed. Depending on the dimensional reduction, two-dimensional coordinates can be output, whereby the two-dimensional map can also be referred to as an embedding 301 (see FIG. 3). In the embedding 301, the wafer maps 40 that are similar can be grouped close to each other. Each of these coordinates in the two-dimensional map of the embedding 301 can in this case correspond to a wafer 30.

The dimensional reduction 203 can further be performed multiple times, whereby the three-dimensional matrix can be reduced by a different set of hyperparameters each time. In other words, after the completion of step 203, there are several two-dimensional maps. In this case, hyperparameters for the matrix creation can include: a quantization of the matrix, in particular how many square millimeters are provided per entry, and/or a standardization of the matrix. Hyperparameters for dimensional reduction can include: a metric (similarity measure) and/or a minimum number of neighbors found and/or the like.

According to further step 204 shown in FIG. 2, automatic detection of clusters by cluster analysis can be provided. Given that the majority of the images cannot exhibit any defects in the wafer data, therefore predominantly featuring few or zero abnormalities, the dimensional reduction results in a main cluster in which most (good) images are located and several smaller subclusters having conspicuous and prominent signatures. These subclusters can be used for the representation. However, the main cluster can be ignored. DBSCAN or similar clustering algorithms for cluster analysis can be applied to each of the two-dimensional maps. The clustering algorithm can in this case be applied to all two-dimensional maps multiple times using different parameterization. In other words, the clustering algorithm can be run using different hyperparameters on each of the two-dimensional maps. For example, 5 different parameterizations of the clustering algorithm×5 different two-dimensional maps can result in 25 cluster analyses.

Figure 3:
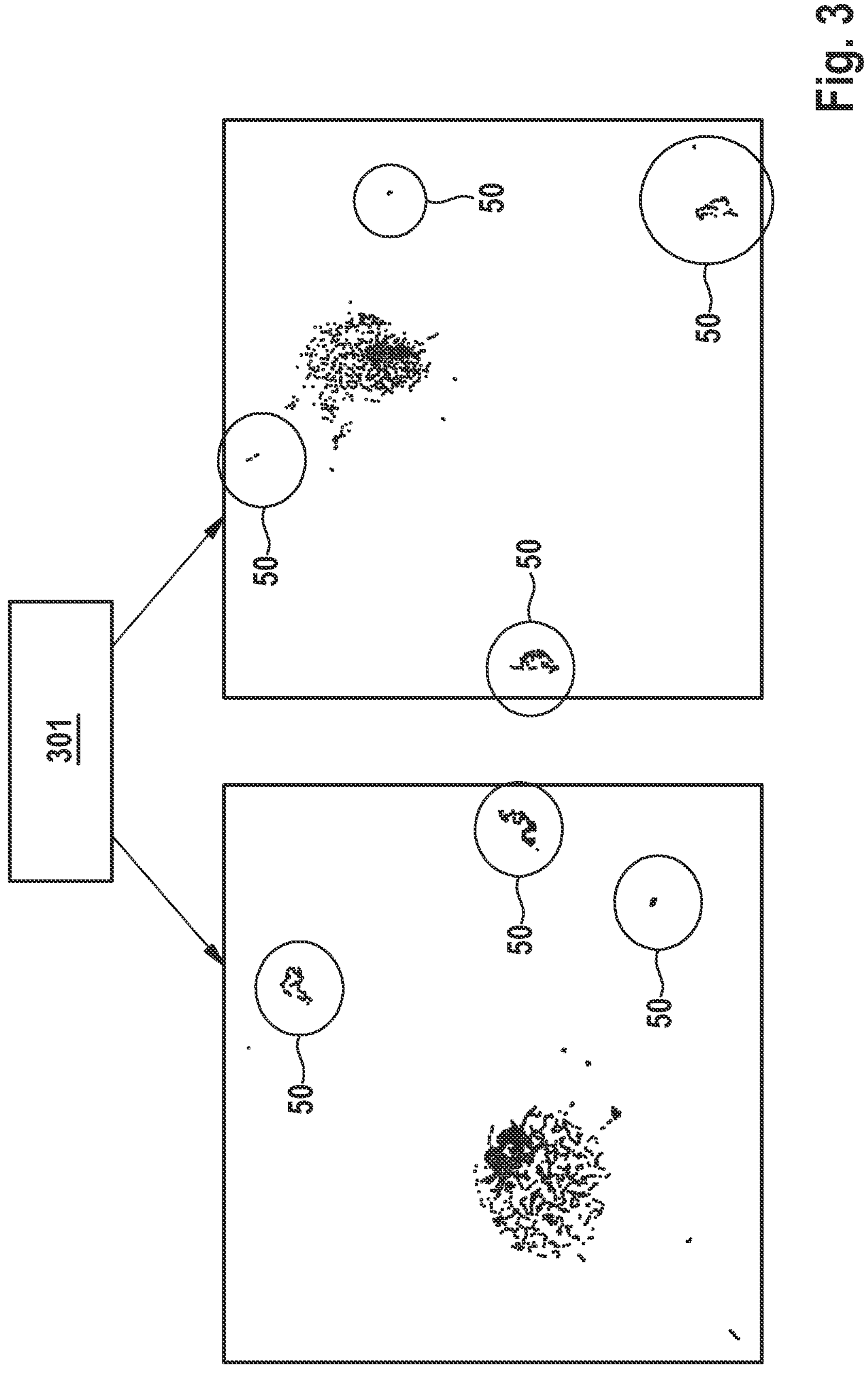
FIG. 3 further details of the method according to one embodiment of the disclosure.

One advantage of multiple execution of cluster analysis using different parameters is that distinct clusters 50 can be determined, which may have remained hidden in individual executions. The results from the cluster analyses can then be compared, condensed, and combined according to a further step 205 illustrated in FIG. 2. The same signatures are identified from the clusters 50, i.e., abnormalities that occur on multiple wafers 30 (e.g., scratches at the same location). In FIG. 3, further details regarding this step 205 are shown and the distinct clusters 50 are labeled. The clusters 50 can be considered signatures for further fault analysis.

Furthermore, steps 206 according to FIG. 2 can optionally be provided for intermediate processing. For example, clusters 50 found twice can in this case be combined into one cluster 50. As a result of the multiple execution of the steps described hereinabove, in particular the dimensional extension and/or the automatic detection of clusters, each having different parameters, some signatures can be found multiple times. In this step, the latter is detected and the signatures found twice are combined so that, ideally, each signature is only displayed and registered once. In addition, self-supervised curing can also be performed: Images that do not appear to fit in a cluster 50 can be removed in order to clean up the cluster 50. The automatically selected images for a signature may be partially unclean and may be automatically cleaned up in this step. For this purpose, an average image can be formed for each signature (for each cluster of images) and a similarity metric (structural similarity) can be used to filter out all images that deviate from the mean value by three standard deviations, for example.

As a further step 207 according to FIG. 2, an output of the plausible clusters 50 from the cluster analyses can be provided. In this case, e.g. between (e.g. 25) cluster analyses, those clusters can be selected that can plausibly be classified as clusters (see previous step for cleaning up). The clusters output from the preceding step can be used for fault analysis as follows: Root cause analysis makes it possible to check the origin of the signature and the batch. An analysis of the production trajectory can be performed to find the erroneous process. Furthermore, a search can be performed in the history to find similar signatures from the past. Similar wafers 30 can also be output from the history with similar signatures. A similarity measure of structural similarity can be used in this case because this method takes image areas that are close to each other into account in the evaluation, and not only individual pixels. If multiple wafers 30 are selected, then the history can then be searched for the average (overlay) of these wafers 30 or each wafer 30 individually. The method can in this case be performed in an automated manner. After finding wafers 30 having similar signatures, the routes of wafer production for these wafers 30 can be broken down. A comparison can in this case be made of which production tools were used shortly before these defects occurred. The event that caused the defects may have occurred on these tools.

The explanation hereinabove of the embodiments describes the present disclosure solely within the scope of examples. Individual features of the embodiments can clearly be combined with one another at will, if technically feasible, without departing from the scope of the present disclosure.

What is claimed is:

1. A method for fault analysis in wafers, comprising:

determining wafer maps comprising indications of anomalies of the wafers, the determined wafer maps including wafer maps for different wafers;

combining the determined wafer maps to form a matrix, the determined wafers being combined (i) using dimensional extension, (ii) using a subsequent dimensional reduction, and (iii) using hyperparameters;

evaluating the determined wafer maps by (i) performing multiple executions of a cluster analysis on the matrix of the determined wafer maps, each of the multiple executions using different parameters for the cluster analysis, and (ii) identifying sets of clusters of the determined wafer maps, each respective set of clusters resulting from a respective execution of the multiple executions of the cluster analysis; and performing the fault analysis based on the sets of clusters.

2. The method according to claim 1, wherein:

the different parameters of the multiple executions of the cluster analysis are selected is performed such that the sets of clusters determined from the multiple executions of the cluster analysis are different from one another; and at least some clusters in the sets of clusters result from more than one of the multiple executions of the cluster analysis.

3. The method according to claim 1, wherein:

the sets of clusters determined from the multiple executions of the cluster analysis are different from one another; and clusters in the sets of clusters that result from more than one of the multiple executions of the cluster analysis are combined.

4. The method according to claim 1, wherein:

same data from the determined wafer maps are analyzed by the multiple executions of the cluster analysis.

5. The method according to claim 1, wherein:

multiple wafers from a wafer production process are provided as the wafers; and the sets of clusters are each identified as signatures specific for consistent anomalies in multiple wafers.

6. The method according to claim 1, wherein:

each of the determined wafer maps from a metrological detection of the anomalies on a respective wafer during wafer production.

7. The method according to claim 1, wherein the respective wafer is as a silicon wafer and/or a metal wafer.

8. A non-transitory computer-readable medium that stores a computer program comprising instructions that, when executed by a computer, prompt the computer to perform the method according to claim 1.

9. A device for data processing, which is configured to perform the method according to claim 1.

* * * * *